(12) United States Patent
Kim et al.

(10) Patent No.: US 9,242,575 B2
(45) Date of Patent: Jan. 26, 2016

(54) METHOD AND SYSTEM FOR CONTROLLING A FUEL CELL VEHICLE

(71) Applicant: Hyundai Motor Company, Seoul (KR)

(72) Inventors: Ji Tae Kim, Gyeonggi-do (KR); Jaemoon Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/251,911

(22) Filed: Apr. 14, 2014

(65) Prior Publication Data

US 2015/0112530 A1    Apr. 23, 2015

(30) Foreign Application Priority Data

Oct. 18, 2013  (KR) .......................... 10-2013-0124412

(51) Int. Cl.

| | |
|---|---|
| *B60L 11/18* | (2006.01) |
| *H01M 8/04* | (2006.01) |
| *H01M 16/00* | (2006.01) |
| *B60L 3/00* | (2006.01) |
| *B60L 7/16* | (2006.01) |

(52) U.S. Cl.
CPC ........... *B60L 11/1887* (2013.01); *B60L 3/0046* (2013.01); *B60L 3/0053* (2013.01); *B60L 3/0076* (2013.01); *B60L 7/16* (2013.01); *B60L 11/1868* (2013.01); *H01M 8/04597* (2013.01); *H01M 8/04917* (2013.01); *H01M 16/006* (2013.01); *H01M 2250/20* (2013.01); *Y10S 903/944* (2013.01)

(58) Field of Classification Search
CPC . B60L 11/1887; B60L 3/0023; B60L 3/0046; B60L 11/1861; B60L 11/123; H02J 1/10; H02M 7/797
USPC ....... 701/22; 429/429, 431; 307/52; 320/103; 363/16; 318/400
See application file for complete search history.

(56) References Cited

U.S. PATENT DOCUMENTS

| | | | | |
|---|---|---|---|---|
| 2006/0055349 | A1* | 3/2006 | Nakayama ............ | B60L 11/123 318/400.18 |
| 2006/0062023 | A1* | 3/2006 | Patwardhan .......... | H02M 7/797 363/15 |
| 2010/0209792 | A1* | 8/2010 | Umayahara ........... | B60L 3/0046 429/429 |
| 2010/0273072 | A1* | 10/2010 | Hasegawa ............. | B60L 3/0023 429/431 |
| 2012/0043923 | A1* | 2/2012 | Ikriannikov et al. .......... | 320/103 |
| 2014/0368041 | A1* | 12/2014 | Tu ....................... | B60L 11/1861 307/52 |

FOREIGN PATENT DOCUMENTS

KR    10-2004-0001776 A    1/2004

* cited by examiner

*Primary Examiner* — Tuan C. To
*Assistant Examiner* — Yuri Kan
(74) *Attorney, Agent, or Firm* — Mintz Levin Cohn Ferris Glovsky and Popeo, P.C.; Peter F. Corless

(57) ABSTRACT

A method and system for controlling a fuel cell vehicle are provided in which a bidirectional converter monitors a state of a fuel cell vehicle in real time to improve control responsiveness in a transient state of the fuel cell vehicle. The method includes receiving, by a bidirectional converter, a command for a current limiting value in the high voltage battery from the fuel cell controller while the fuel cell vehicle is driven. In addition, the bidirectional converter is configured to determine whether the fuel cell vehicle is switched to a predetermined mode and change the current limiting value of the high voltage battery. A predetermined control is performed by the bidirectional converter based on the changed current limiting value when the fuel cell vehicle is switched to the predetermined mode.

12 Claims, 3 Drawing Sheets

METHOD AND SYSTEM FOR CONTROLLING A FUEL CELL VEHICLE

CROSS-REFERENCE TO RELATED APPLICATION

This application claims priority to and the benefit of Korean Patent Application No. 10-2013-0124412 filed in the Korean Intellectual Property Office on Oct. 18, 2013, the entire contents of which are incorporated herein by reference.

TECHNICAL FIELD

The present disclosure relates to a method and system for controlling a fuel cell vehicle in which a bidirectional converter monitors a state of the fuel cell vehicle in real time to improve control responsiveness in a transient state of the fuel cell vehicle.

BACKGROUND

In general, a fuel cell system that is mounted in a fuel cell vehicle is configured to supply hydrogen, which is used as fuel, and air to a fuel cell stack, and electricity is produced by an electrochemical reaction of the hydrogen and the oxygen within the fuel cell stack. The fuel cell vehicle is driven by operating an electric motor with electricity produced by the fuel cell stack. The fuel cell vehicle further includes a high voltage battery to use energy of the fuel cell system and energy of the high voltage battery.

As shown in FIG. 1, the fuel cell vehicle including the fuel cell system and the high voltage battery typically includes a bidirectional converter 20 that effectively controls energy flow from both the fuel cell system and the high voltage battery. The bidirectional converter may be a bidirectional direct current-direct current (DC/DC) converter or a large-capacity bidirectional DC/DC converter. In addition, the fuel cell vehicle includes a fuel cell controller 10 configured to operate the fuel cell vehicle, as shown in FIG. 1. The fuel cell controller may be referred to as a fuel-cell control unit (FCU). In FIG. 1, reference numeral 30 indicates a fuel cell system, 40 indicates an inverter, 50 indicates a high voltage battery, 60 indicates a motor, 70 indicates a low voltage DC/DC converter, and 80 indicates an auxiliary battery. The indicated elements are well-known to those skilled in the art, and thus detailed descriptions thereof will be omitted.

Referring to FIG. 1, an energy flow, an energy amount, and a mode switch associated with charging and discharging of the high voltage battery 50 may be determined based on commands from the fuel cell controller 10. A discharging energy supplied from the high voltage battery 50 is supplied to electrical loads of a fuel cell vehicle via the bidirectional converter 20 in which power conversion is performed. When a state of charge (SOC) of the high voltage battery 50 decreases while the fuel cell vehicle is being driven, the bidirectional converter 20 supplies energy from the fuel cell stack to the high voltage battery 50. When a braking signal in the fuel cell vehicle occurs, the bidirectional converter 20 supplies regenerative braking energy produced by regenerative braking based on a command of the fuel cell controller 10 to the high voltage battery 50 to charge the high voltage battery 50.

The above-described energy flow may be processed within several hundred milliseconds to several seconds while the fuel cell vehicle is driving. However, since the bidirectional converter performs a predetermined control based on commands from the fuel cell controller that is a superordinate controller over the bidirectional converter even in a transient state in which a rapid energy conversion is required in the fuel cell vehicle, an overshoot/undershoot voltage may abruptly occur. The overshoot/undershoot voltage influences an output voltage of the high voltage battery, causing abrupt shaking, breakdown by overvoltage, and durability reduction of components while the fuel cell vehicle is being driven.

The above information disclosed in this section is merely for enhancement of understanding of the background of the disclosure and therefore it may contain information that does not form the prior art that is already known in this country to a person of ordinary skill in the art.

SUMMARY

The present disclosure provides a method and system for controlling a fuel cell vehicle in which a bidirectional converter may be configured to directly monitor a state of the fuel cell vehicle in real time based on performance of the bidirectional converter to improve control responsiveness in a transient state of the fuel cell vehicle.

An exemplary embodiment of the present disclosure provides a method of controlling a fuel cell vehicle that may include a fuel cell system, a high voltage battery, a bidirectional converter configured to control energy flow from the fuel cell system and the high voltage battery, and a fuel cell controller configured to operate the fuel cell vehicle. The method of controlling a fuel cell vehicle may include: receiving, by the bidirectional converter, a command for a current limit value in the high voltage battery from the fuel cell controller while the fuel cell vehicle is being driven; determining, by the bidirectional converter, whether the fuel cell vehicle is switched to a predetermined mode; and changing, by the bidirectional converter, the current limit value of the high voltage battery, and performing a predetermined control based on the changed current limiting value when the fuel cell vehicle is switched to the predetermined mode.

The predetermined mode may include a regenerative braking mode and a sudden acceleration mode. The bidirectional converter may be configured to subtract a current value of the high voltage battery from the current limiting value when the fuel cell vehicle is switched to the predetermined mode, and change the current limiting value when the difference value is less than a predetermined value. In addition, the bidirectional converter may be configured to reduce the current limiting value by a predetermined ratio when the fuel cell vehicle is switched to the regenerative braking mode and the difference value is less than the predetermined value. The bidirectional converter may be configured to increase the current limiting value by a predetermined ratio when the fuel cell vehicle is switched to the sudden acceleration mode and the difference value is less than the predetermined value. The predetermined value compared to the difference value may be about 5% of the current limiting value.

Another exemplary embodiment of the present disclosure provides a system for controlling a fuel cell vehicle having a fuel cell system and a high voltage battery, that may include: a bidirectional converter configured to control energy flow from the fuel cell system and the high voltage battery; and a fuel cell controller, operating as a superordinate controller over the bidirectional converter, configured to operate the fuel cell vehicle.

The bidirectional converter may be operated by a process configured to execute a program that includes a series of commands for executing a method of controlling a fuel cell vehicle, the method may include: receiving, by the bidirectional converter, a command for a current limiting value in the high voltage battery from the fuel cell controller while the fuel cell vehicle is being driven; determining, by the bidirectional converter, whether the fuel cell vehicle is switched to a predetermined mode; and changing, by the bidirectional converter, the current limiting value of the high voltage battery, and performing a predetermined control based on the changed current limiting value when the fuel cell vehicle is switched to the predetermined mode.

According to an exemplary embodiment of the present disclosure, it may be possible to improve control responsiveness in a transient state of a fuel cell vehicle by controlling the fuel cell vehicle in which a bidirectional converter monitors a state of the fuel cell vehicle in real time. In other words, according to an exemplary embodiment of the present disclosure, it may be possible to solve a shutdown problem of a fuel cell vehicle resulting from voltage/current overshoot and undershoot occurring at an output side of a high voltage battery in switching to a sudden mode (e.g., regenerative braking mode, sudden acceleration mode, etc.) while the fuel cell vehicle is being driven, to maintain durability of high voltage components, and to enhance control efficiency by properly adjusting the current.

DETAILED DESCRIPTION

Figure 1:
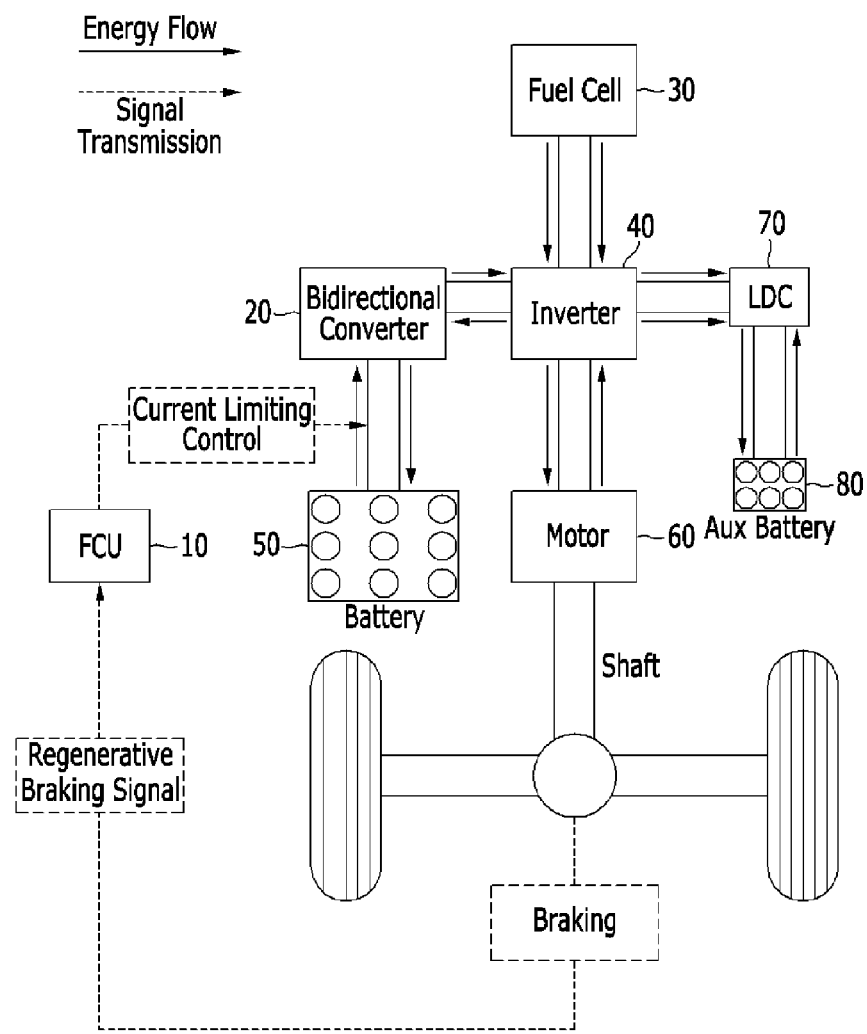
FIG. 1 is an exemplary block diagram illustrating a typical control system of a fuel cell vehicle according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present disclosure will be described more fully hereinafter with reference to the accompanying drawings, in which exemplary embodiments of the disclosure are shown. As those skilled in the art would realize, the described exemplary embodiments may be modified in various different ways, all without departing from the spirit or scope of the present disclosure.

Figure 2:
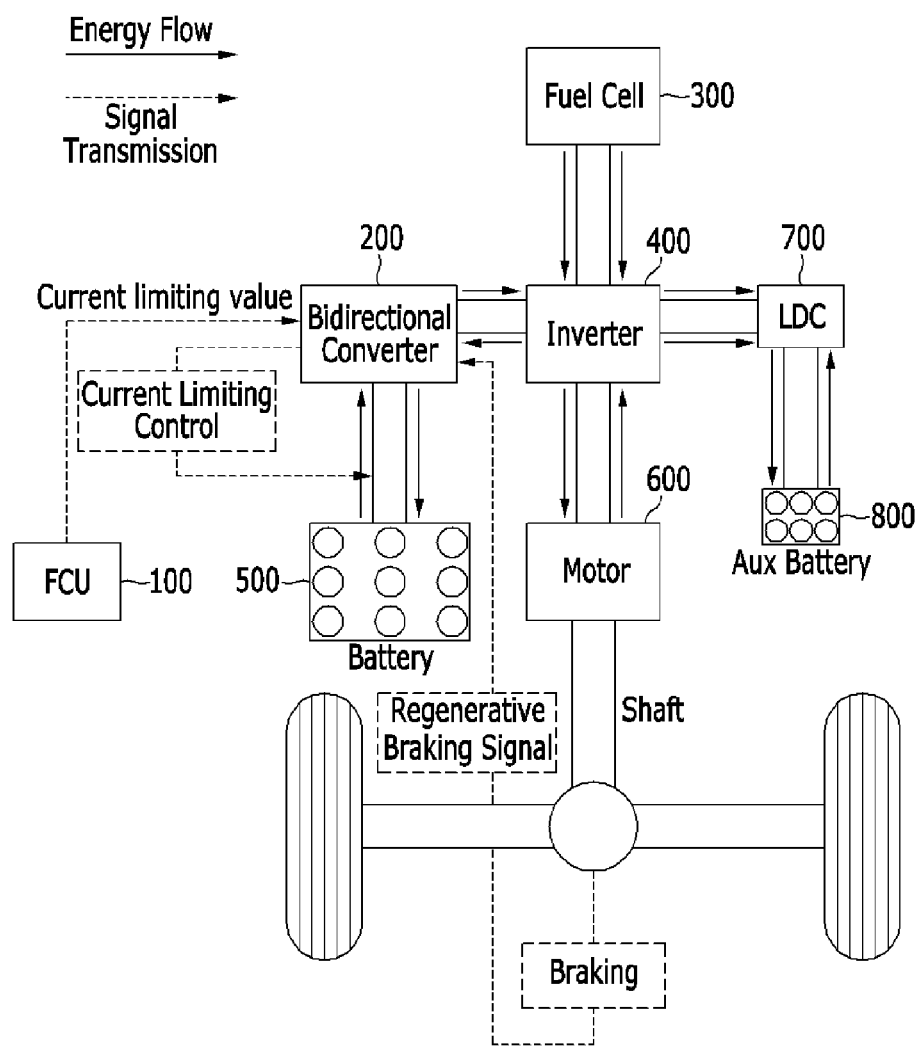
FIG. 2 is an exemplary block diagram illustrating a system for controlling a fuel cell vehicle according to an exemplary embodiment of the present invention.

FIG. 2 is an exemplary block diagram illustrating a system for controlling a fuel cell vehicle according to an exemplary embodiment of the present invention. The system according to an exemplary embodiment of the present disclosure may be applied to a fuel cell vehicle that includes a fuel cell system 300 and a high voltage battery 500. The system may include a bidirectional converter 200 configured to control energy flow from the fuel cell system 300 and the high voltage battery 500, and a fuel cell controller 100, operating as a superordinate controller over the bidirectional converter 200, configured to operate the fuel cell vehicle. The bidirectional converter 200 may be referred to as a bidirectional DC/DC converter or a large-capacity bidirectional DC/DC converter.

The system may further include, as shown in FIG. 2, an inverter 400, a motor 600, a low voltage DC/DC converter (LDC) 700, and an auxiliary battery 800. Since the fuel cell controller 100, the fuel cell system 300, the inverter 400, the high voltage battery 500, the motor 600, the LDC 700, and the auxiliary battery 800 are typically provided within a fuel cell vehicle and are apparent to those skilled in the art, a detailed description thereof will be omitted. That is, the fuel cell controller 100, the fuel cell system 300, the inverter 400, the high voltage battery 500, the motor 600, the LDC 700, and auxiliary battery 800 may correspond to those that are shown in FIG. 1, respectively. The bidirectional converter 200 may include one or more processors or microprocessors and/or hardware operated by a program including a series of commands for executing a method of controlling a fuel cell vehicle according to an exemplary embodiment of the present disclosure which will be described below.

Figure 3:
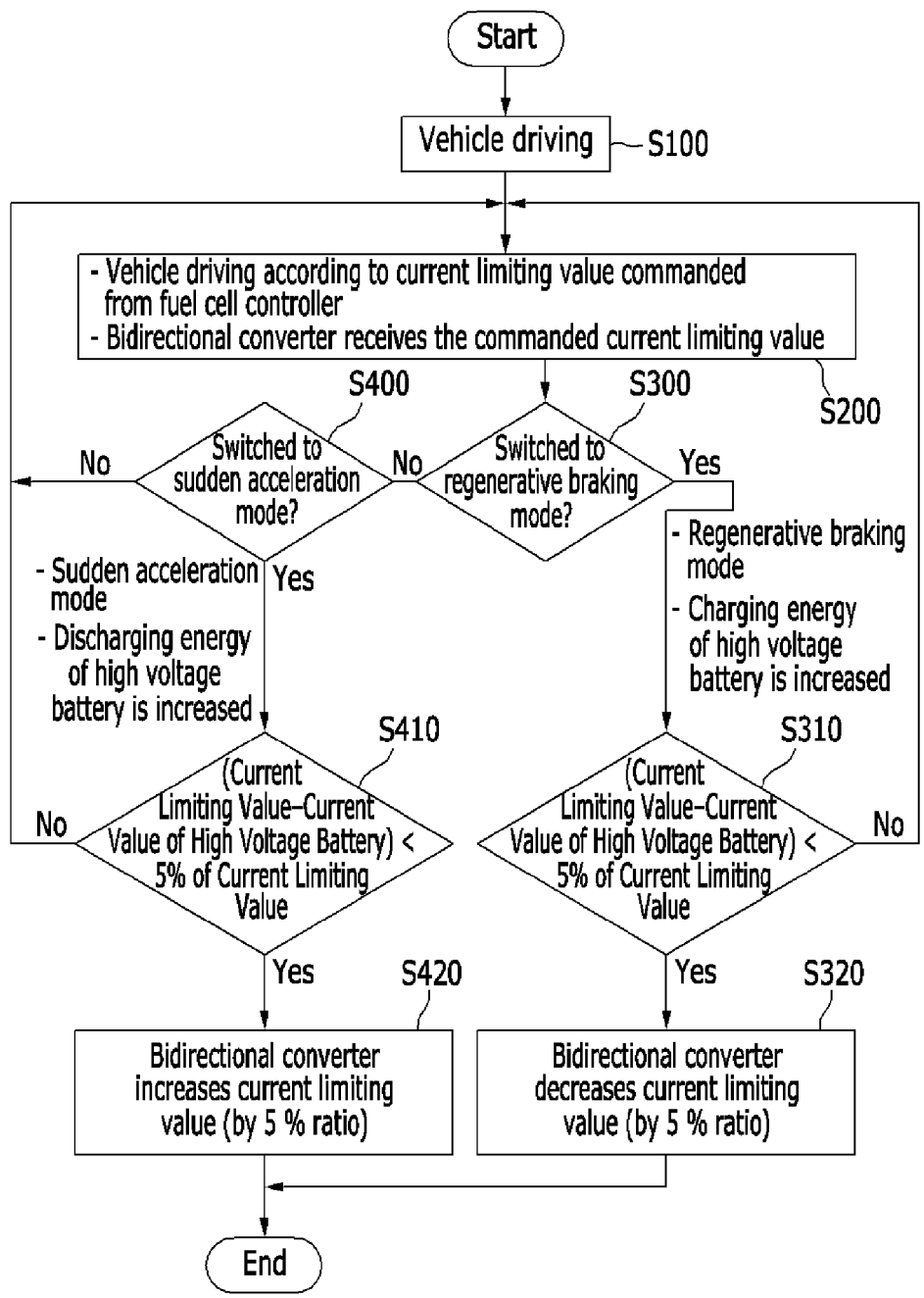
FIG. 3 is an exemplary flowchart illustrating a method of controlling a fuel cell vehicle according to an exemplary embodiment of the present invention.

Hereinafter, a method of controlling a fuel cell vehicle according to an exemplary embodiment of the present disclosure will be described in detail with reference to the accompanying drawings. FIG. 3 is an exemplary flowchart illustrating a method of controlling a fuel cell vehicle according to an exemplary embodiment of the present invention.

A fuel cell vehicle to which the method is applied may be a vehicle that first converts energy of the high voltage battery 500 through the bidirectional converter 200 to drive (e.g., start) the motor 600. After the motor 600 is started, the fuel cell system 300 may be activated and may be configured to generate energy (e.g., electrical power), and supply the energy to the high voltage battery 500. The high voltage battery 500 may be configured to perform a boost mode during acceleration and a buck mode during regenerative braking based on a control command from the fuel cell controller 100 and the bidirectional converter 200, repeatedly. The boost mode may be referred to as a discharging mode, and the buck mode a regenerative braking mode.

When the fuel cell vehicle is driven in a normal acceleration state (e.g., with no sudden acceleration) or an ordinary running state at step S100, the bidirectional converter 200 may be configured to perform current control of the high voltage battery 500 based on a command associated with a current limiting value of the high voltage battery 500 from the fuel cell controller 100 at step S200. In addition, when the fuel cell vehicle is driven in the normal acceleration state or the ordinary running state, the bidirectional converter 200 may be configured to perform the current control of the high voltage battery 500 in the same way as in the related art. When the running state of the fuel cell vehicle is switched to a regenerative braking state (mode) from the normal acceleration state or the typical ordinary running state, the bidirectional converter 200 may be configured to detect the regenerative braking state at step S300. The fuel cell vehicle switched to the regenerative braking state may be detected using known related functions and constitutions, for example, determining whether a braking signal is generated.

When the bidirectional converter 200 detects the regenerative braking state (mode), the bidirectional converter 200 may be configured to subtract a current value of the high voltage battery 500 from a current limiting value transmitted from the fuel cell controller 100. When the difference value is less than a predetermined value (e.g., about 5% of the current limiting value), the bidirectional converter 200 may be configured to perform a current control of the high voltage battery 500 such as reducing the current limiting value by a predetermined ratio, for example, by about 5% at steps S310 and S320.

When the fuel cell vehicle is switched to the regenerative braking state, since an energy flow of the high voltage battery may be maintained, a current direction of the high voltage battery 500 may switch from positive (+) to negative (−). In an instant point at which the current direction of the high voltage battery 500 switches from positive (+) to negative (−), when an output current of the high voltage battery 500 reaches the current limiting value transmitted from the fuel cell controller 100, since an actual power amount of the high voltage battery 500 exceeds a power amount that corresponds to the current limiting value, an output voltage of the high voltage battery 500 may suddenly rise, and thus may enter an over-voltage state.

Accordingly, while the fuel cell vehicle is driven in a regenerative braking state, the bidirectional converter 200 may be configured to subtract an actual current value of the high voltage battery 500 from the current limiting value to determine whether the difference value is less than about 5% of the current limiting value. When the difference value is less than about 5% of the current limiting value, the bidirectional converter 200 may be configured to subsequently decrease the current limiting value by about 5% in a predetermined period to reduce an actual power amount of the high voltage battery 500 that suddenly rises. Therefore, the bidirectional converter 200 may be configured to prevent an output voltage of the high voltage battery 500 from rising suddenly. When the output voltage of the high voltage battery 500 enters a normal state value (e.g., about 80~90% of the high voltage battery), the bidirectional converter 200 may be configured to perform a current control of the high voltage battery 500 according to a current limiting value transmitted from the fuel cell controller 100.

When the fuel cell vehicle is driven in a sudden acceleration state, for example, a running mode of the fuel cell vehicle is switched to a sudden acceleration mode at step S400, the high voltage battery 500 may be configured to discharge a substantial amount of energy to correspond to the sudden acceleration mode. In particular, since an actual power amount outputted from the high voltage battery 500 may be limited by the current limiting value, an output voltage of the high voltage battery 500 may be instantly decreased to enter a low voltage state.

Therefore, the bidirectional converter 200, in a similar way as in the regenerative braking state described above, may be configured to subtract an actual current value of the high voltage battery 500 from the current limiting value to determine whether the difference value is less than about 5% of the current limiting value at step S410. When the difference value is less than about 5% of the current limiting value, the bidirectional converter 200 may be configured to subsequently increase the current limiting value by about 5% in a predetermined period to overcome problems resulting from a transient state related to the sudden acceleration state and achieve improved current flow from the high voltage battery at step S420. When the output current of the high voltage battery 500 becomes a normal state value, the bidirectional converter 200 may be configured to perform a current control of the high voltage battery 500 based on a current limiting value transmitted from the fuel cell controller 100.

As described above, in a transient state in which a fuel cell vehicle is switched to a sudden mode (e.g., a regenerative braking mode, a sudden acceleration mode, etc.), unlike the related art, the method according the exemplary embodiment of the present disclosure may determine the transient state through the bidirectional converter 200 by itself, and adjust the current limiting value, and thus more stably output current from the high voltage battery without shaking caused by instant energy in the high voltage battery 500.

While this disclosure has been described in connection with what is presently considered to be practical exemplary embodiments, it is to be understood that the disclosure is not limited to the disclosed exemplary embodiments, but, on the contrary, is intended to cover various modifications and equivalent arrangements included within the spirit and scope of the accompanying claims.

DESCRIPTION OF REFERENCE NUMERALS

100: Fuel Cell Controller
200: Bidirectional Converter
500: High Voltage Battery

What is claimed is:
1. A method of controlling a fuel cell vehicle that comprises a fuel cell system, a high voltage battery, a bidirectional converter configured to control energy flow from the fuel cell system and the high voltage battery, and a fuel cell controller configured to operate the fuel cell vehicle, the method comprising:
receiving, by the bidirectional converter, a command for a current limit value in the high voltage battery from the fuel cell controller while the fuel cell vehicle is driven;

determining, by the bidirectional converter, whether the fuel cell vehicle is switched to a predetermined mode, wherein the predetermined mode includes a regenerative braking mode and a sudden acceleration mode; and changing, by the bidirectional converter, the current limit value of the high voltage battery, and performing a predetermined control based on the changed current limiting value when the fuel cell vehicle is switched to the predetermined mode;

subtracting, by the bidirectional converter, a current value of the high voltage battery from the current limiting value when the fuel cell vehicle is switched to the predetermined mode;

changing, by the bidirectional converter, the current limiting value when the difference value is less than a predetermined value;

subtracting, by the bidirectional converter, a current value of the high voltage battery from the current limiting value when the fuel cell vehicle is switched to the predetermined mode; and changing, by the bidirectional converter, the current limiting value when the difference value is less than a predetermined value.

2. The method of claim 1, wherein the method further comprises:

reducing, by the bidirectional converter, the current limiting value by a predetermined ratio when the fuel cell vehicle is switched to the regenerative braking mode and the difference value is less than the predetermined value.

3. The method of claim 1, wherein the method further comprises:

increasing, by the bidirectional converter, the current limiting value by a predetermined ratio when the fuel cell vehicle is switched to the sudden acceleration mode and the difference value is less than the predetermined value.

4. The method of claim 1, wherein the predetermined value compared to the difference value is about 5% of the current limiting value.

5. A system for controlling a fuel cell vehicle that comprises a fuel cell system and a high voltage battery, the system comprising:

a bidirectional converter configured to control energy flow from the fuel cell system and the high voltage battery; and a fuel cell controller, operating as a superordinate controller above the bidirectional converter, configured to operate the fuel cell vehicle, wherein the bidirectional converter is operated by a program, and the program includes a series of commands for executing a method of controlling a fuel cell vehicle, the method comprising:

receiving, by the bidirectional converter, a command for a current limiting value in the high voltage battery from the fuel cell controller while the fuel cell vehicle is driven;

determining, by the bidirectional converter, whether the fuel cell vehicle is switched to a predetermined mode, wherein the predetermined mode includes a regenerative braking mode and a sudden acceleration mode; and changing, by the bidirectional converter, the current limiting value of the high voltage battery, and performing a predetermined control based on the changed current limiting value when the fuel cell vehicle is switched to the predetermined mode, wherein the bidirectional converter is configured to:

subtract the current of the high voltage battery from the current limiting value when the fuel cell vehicle is switched to the predetermined mode; and change the current limiting value when the difference value is less than a predetermined value.

6. The system of claim 5, wherein the bidirectional converter is configured to:

reduce the current limiting value by a predetermined ratio when the fuel cell vehicle is switched to the regenerative braking mode and the difference value is less than the predetermined value.

7. The system of claim 5, wherein the bidirectional converter is configured to:

increase the current limiting value by a predetermined ratio when the fuel cell vehicle is switched to the sudden acceleration mode and the difference value is less than the predetermined value.

8. The system of claim 5, wherein the predetermined value compared to the difference value is about 5% of the current limiting value.

9. A non-transitory computer readable medium containing program instructions executed by a processor, the computer readable medium comprising:

program instructions that receive a command for a current limiting value in the high voltage battery from the fuel cell controller while the fuel cell vehicle is driven;

program instructions that determine whether the fuel cell vehicle is switched to a predetermined mode, wherein the predetermined mode includes a regenerative braking mode and a sudden acceleration mode;

program instructions that change the current limiting value of the high voltage battery, and performing a predetermined control based on the changed current limiting value when the fuel cell vehicle is switched to the predetermined mode;

program instructions that subtract the current of the high voltage battery from the current limiting value when the fuel cell vehicle is switched to the predetermined mode; and program instructions that change the current limiting value when the difference value is less than a predetermined value.

10. The non-transitory computer readable medium of claim 9, further comprising:

program instructions that reduce the current limiting value by a predetermined ratio when the fuel cell vehicle is switched to the regenerative braking mode and the difference value is less than the predetermined value.

11. The non-transitory computer readable medium of claim 9, further comprising:

program instructions that increase the current limiting value by a predetermined ratio when the fuel cell vehicle is switched to the sudden acceleration mode and the difference value is less than the predetermined value.

12. The non-transitory computer readable medium of claim 9, wherein the predetermined value compared to the difference value is about 5% of the current limiting value.

* * * * *